(12) United States Patent
Okuyama (10) Patent No.: US 6,753,065 B2
(45) Date of Patent: Jun. 22, 2004

(54) WET-SLIP RESISTANT SHEET AND WET-SLIP RESISTANT STRUCTURE

(75) Inventor: Takahide Okuyama, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/197,147

(22) Filed: Jul. 17, 2002

(65) Prior Publication Data

US 2003/0026951 A1 Feb. 6, 2003

(30) Foreign Application Priority Data

Jul. 19, 2001 (JP) ........................................ 2001-219631

(51) Int. Cl.[7] .............................. B32B 3/00; B32B 3/28; B32B 3/30; B32B 1/00; B32B 7/02
(52) U.S. Cl. ...................... 428/156; 428/167; 428/172; 428/174; 428/141; 428/212; 428/120
(58) Field of Search .................................. 428/156, 167, 428/172, 120, 141, 212, 174, 119

(56) References Cited

U.S. PATENT DOCUMENTS

| | | | |
|---|---|---|---|
| 3,124,811 A | * | 3/1964 | Treacy ............................ 4/583 |
| RE25,751 E | | 4/1965 | Seedorf |
| 3,267,187 A | | 8/1966 | Slosberg et al. |
| 3,547,769 A | | 12/1970 | Albrinck et al. |
| 3,684,348 A | * | 8/1972 | Rowland ........................ 359/530 |
| 3,999,224 A | * | 12/1976 | Kollsman ........................ 4/583 |
| 4,060,947 A | | 12/1977 | Naka |
| 4,172,063 A | | 10/1979 | O'Brill |
| 4,196,243 A | | 4/1980 | Sachs et al. |
| 4,248,922 A | | 2/1981 | Shortway et al. |
| 4,328,274 A | | 5/1982 | Tarbutton et al. |
| 4,689,259 A | | 8/1987 | Miller, Jr. et al. |
| 4,875,799 A | | 10/1989 | Harrison |
| 4,921,754 A | | 5/1990 | Ishihara |
| 4,944,514 A | | 7/1990 | Suiter |
| 5,167,087 A | | 12/1992 | Plumly |

(List continued on next page.)

FOREIGN PATENT DOCUMENTS

| | | |
|---|---|---|
| EP | 0 492 907 | 1/1992 |
| EP | 0 683 268 | 11/1995 |
| JP | 53-113875 | 10/1978 |
| JP | 56-5638 | 1/1981 |
| JP | 57-51460 | 3/1982 |
| JP | 59-157035 | 10/1984 |
| JP | 59-230745 | 12/1984 |
| JP | 2-144461 | 6/1990 |
| JP | 4-305500 | 10/1992 |
| JP | 7-11202 | 1/1995 |
| JP | 7-207826 | 8/1995 |
| JP | 7-207-828 | 8/1995 |
| WO | WO97/18947 | 5/1997 |

OTHER PUBLICATIONS

ASTM Standard E 303–93, "Standard Test Method for Measuring Surface Frictional Properties Using the British Pendulum Tester," Annual Book of ASTM Standards, vol. 04.03 pp. 621–625 (1994).

(List continued on next page.)

Primary Examiner—Harold Pyon
Assistant Examiner—Catherine Ann Simone
(74) Attorney, Agent, or Firm—James D. Christoff (57) ABSTRACT

A wet-slip resistant sheet comprises a substrate having a front surface, a back surface and a plurality of tapered protrusions, one end of each of which is bonded to the front surface of the substrate. The tapered protrusions are regularly arranged on the front surface of the substrate with a repeating pattern and each of said protrusions is surrounded with grooves which intersect each other. The wet-slip resistant sheet provides good wet-slip resistance and exhibits good clean recovery properties, and the BPN value of the sheet can be easily controlled.

5 Claims, 2 Drawing Sheets

U.S. PATENT DOCUMENTS

| | | |
|---|---|---|
| 5,246,757 A | 9/1993 | Condon et al. |
| 5,286,682 A | 2/1994 | Jacobs et al. |
| 5,380,549 A | 1/1995 | Harvison |
| 5,389,413 A | 2/1995 | Condon et al. |
| 5,453,320 A | 9/1995 | Harper et al. |
| 5,468,532 A | 11/1995 | Ho et al. |
| 5,491,015 A | 2/1996 | Reeves et al. |
| 5,508,084 A | 4/1996 | Reeves et al. ............... 428/172 |
| 5,508,154 A | 4/1996 | Mizukawa et al. |
| 5,536,569 A | 7/1996 | Lasch et al. |
| 5,709,763 A | 1/1998 | Nakanishi et al. |
| 5,848,769 A * | 12/1998 | Fronek et al. ............... 244/200 |
| 6,180,228 B1 | 1/2001 | Mueller et al. |
| 6,372,323 B1 * | 4/2002 | Kobe et al. ................. 428/119 |

OTHER PUBLICATIONS

Product Brochure, "3M™ Scotchprint™ and Electrostatic Graphic Materials" (1996).

Product Brochure, "3M™ Floorminders™ Graphics" (1997).

Product Brochure, "3M™ Floorminders™ Graphics with New Clear Base Film" (1997).

* cited by examiner

WET-SLIP RESISTANT SHEET AND WET-SLIP RESISTANT STRUCTURE

CROSS-REFERENCE TO RELATED APPLICATIONS

This application claims foreign priority to Japanese patent application no. 2001-219631 filed Jul. 19, 2001.

BACKGROUND OF THE INVENTION

1. Field of the Invention

The present invention relates to a wet-slip resistant sheet and a wet-slip resistant structure. In particular, the present invention relates to a wet-slip resistant sheet comprising a substrate having a surface on which a plurality of tapered protrusions formed of a resin composition and being surrounded with a plurality of grooves which intersect each other, and a back surface opposing to the surface. This wet-slip resistant sheet has wet-slip resistance suitable for the application on floor surfaces.

The wet-slip resistant sheet of the present invention is useful as a slip-resistant sheet for a floor surface, which has an adhesive layer fixed to the back surface of the substrate and is fixed to a floor surface by the adhesive layer. In addition, the substrate is light-transmissive, and thus the wet-slip resistant sheet of the present invention is useful as a graphics-protective sheet which protects the graphics formed between the substrate and the floor surface. The graphics-protective sheet is particularly useful as a protective layer for a decorative sheet which has graphics fixed to the back surface of the substrate and decorates the floor surface.

2. Description of the Related Art

Hitherto, graphics are applied to a base film or a recording medium with a printing means such as an electrostatic printing method or an ink jet printing method, and the film or the medium having the applied graphics is used as a sign for advertising or guiding. The film or the medium having the graphics is fixed to the surface of a material such as a floor surface of a building by an adhesive layer which is provided on the back surface of the base film or the medium. To protect the graphics from damage, stain, etc., a graphics-protective sheet comprising a film or a sheet with a high light transmittance is laminated on the surface of the film or the substrate having the applied graphics. The graphics-protective sheet is adhered to the film or the substrate having the graphics by an adhesive layer, so that the graphics can be seen through the graphics-protective sheet.

A product such as the decorative sheet having the graphics protected with the protective sheet has been recently used as a decorative sheet for a floor surface. The decorative sheet for the floor surface is used by adhering it to a floor (or a material for constructing a floor) for simple repairing or as an advertising or guiding sign at a place having a relatively large number of passersby in a hotel, a shop, etc. Since the decorative sheet for the floor surface is used in such a way, it is required to have different properties than a decorative sheet for a signboard or a wall. One of such properties is wet-slip resistance on the surface of the sheet, since the decorative sheet for the floor surface should effectively prevent the slippage of the sole of a foot of the passerby (including a shoe's sole) so that the passerby can walk on the sheet with no unusual feeling such as if the sheet were not fixed.

A nonslip sheet or a slip-resistant sheet which is fixed to the floor surface has a roughened surface and makes use of a gripping effect of protrusions formed by roughening. Many slip-resistant sheets are known, and are generally of two types. In one type, inorganic particles which form protrusions on the surface are dispersed and fixed, and in the other type, the sheet surface is roughened to form protrusions.

One example of the former type is a nonslip protective film comprising a soft synthetic resin containing fine particles added thereto as described in JP-A-2-144461, that is, a method for imparting the abrasion resistance and nonslip function to the film by adding hard particles such as alumina particles to the soft synthetic resin. However, in this method, the transparency of the protective film deteriorates unless the hard particles are transparent spherical particles (beads). Therefore, such a protective film is not useful as a graphics-protective sheet.

It is preferable to use the surface roughening method like in the above latter type so that the slip resistance of the surface of the protective sheet is enhanced without deteriorating the visibility of the graphics which is seen through the graphics-protective sheet. The graphics-protective sheet having the enhanced slip resistance and the decorative sheet which uses such a protective sheet are disclosed in U.S. Pat. No. 6,180,228 (corresponding to WO99/44840). This patent specification discloses a graphics article useful as a decorative sheet for a floor surface, that is, a graphics article comprising:

(a) a base film with a first major surface and a second major surface, a base film adhesive layer applied on the first major surface, wherein the base film adhesive layer comprises an adhesive composition selected such that the article will be removable from an outdoor surface, and an image layer applied to the second major surface of the base film; and (b) a substantially clear graphics-protective sheet (which is named an image-protective top film in the U.S. patent) with a first major surface and a second major surface, a layer of a substantially clear adhesive on the first major surface, and wherein the second major surface of the image-protective layer is surface-roughened (embossed) to provide a BPN of at least 35 as measured by the procedures specified in ASTM E-303-93; wherein the graphics-protective sheet is attached to and overlies the base film and the image layer, and the image layer is visible through the graphics-protective sheet.

The image layer affords image information (visually displayed information such as an advertisement, a destination guides, etc.) to observers who see the graphics. The base film may be a vinyl resin film, a polyurethane film, etc., and the adhesive for the base film may be an acrylic adhesive. The clear adhesive for the graphics-protective sheet may be an acrylic pressure-sensitive adhesive.

Such a graphics article can construct an outdoor-advertising system when it is fixed to the floor surface. That is, passersby who walk on the graphics article fixed to the floor surface can see the image layer in good condition, and can walk on the graphics article with no unusual feeling such as if the article were not present.

U.S. Pat. No. 5,508,084 (corresponding to JP-A-10-502305) discloses a slip-resistant sheet having, on its surface, a plurality of tapered protrusions regularly arranged with a specific repeating pattern which are formed by surface roughening. The slip resistant sheet disclosed comprises a substrate having a surface and a back surface opposing to the surface, and a plurality of tapered protrusions of a resin composition, one end of each of which is bonded to the surface of the substrate. Each protrusion extends from one end to the other and is tapered towards the other end, and the tapered protrusions are regularly arranged on the surface of the substrate with a specific repeating pattern.

The above U.S. patent describes that a cubic structure such as a polygonal pyramid or a cone is preferable as the protrusion. The height of the protrusion is typically from 0.075 to 0.525 mm, preferably from 0.125 to 0.225 mm, most preferably 0.175 mm. The aspect ratio of the protrusion is usually from 0.1 to 5, and in the case of the polygonal pyramid, it is from 0.3 to 0.6. The aspect ratio (Asp) means the ratio of the protrusion's height H to its equivalent base diameter (L) (Asp=H/L). This US patent describes that such a slip resistant sheet is useful as a mouse pad. Also, this US patent discloses that such a slip resistant sheet may be used in an airplane as a cover for a pull-down tray, or as a coaster for a drink container.

SUMMARY OF THE INVENTION

In the case of a wet-slip resistant sheet, the slip resistance in a wet state (under wet conditions) is preferably increased. When the slip resistant sheet is fixed to a floor surface of a building which directly or indirectly communicates with outdoors, passersby walk on the sheet in the undried state. Water from outdoors from, for example, rain or snow is conveyed onto the sheet spontaneously, or with moving bodies such as passersby, animals, goods, etc. The slip resistant sheet used on the floor surface should have an improved function to prevent the slippage of the sole of a foot of the passerby (including a shoe's sole) on the sheet surface, that is, the improved wet-slip resistance. From such a viewpoint, the BPN value, which is measured according to ASTM E-303-93, should be at least 35 as disclosed in U.S. Pat. No. 6,180,228.

However, if the BPN value is too high, the clean recovery properties tend to decrease. In the case of the slip resistant sheet having a plurality of protrusions on its surface, the protrusions abrade the soles of the shoes and abrasion marks (sometimes called heel marks), which are formed of debris generated by abrading the soles of the shoes or the dirt from the soles of the shoes, tend to remain. When the BPN value is too high, the abrasion ability of the protrusions on the surface of the sheet is relatively high, and the abraded debris is easily captured in the grooves between the protrusions. Therefore, when the BPN is too high, the clean recovery properties are almost lost, and the abrasion marks may not be removed with a relatively simple cleaning method (such as cleaning with water using a brush). The rub-off stain due to the abrasion marks, which are barely removed, tends to be worse in the case of the pyramids (polygonal pyramids) or the cones having pointed apexes.

With the slip resistant sheet for the floor surface, it is important to control the BPN value in a specific range. Thus, the inventors initially attempted to optimally design the size of a protrusion using protrusions arranged along a regular pattern in order to control the BPN value. However, it was found that the size of the protrusion had no correlation with the BPN value and was not a good index for controlling the BPN value. Then, after further research and study, it was found that the BPN value can be controlled in the specific range, when a shape factor of the whole protrusions (PI, Profile Index) is controlled in a certain range.

Thus, an object of the present invention is to provide a wet-slip resistant sheet having a BPN value that can be easily controlled, and achieves the desired wet-slip resistance and clean recovery properties at the same time.

To solve the above problems, the present invention provides a wet-slip resistant sheet comprising a substrate having a front surface and a back surface opposing to the front surface, and a plurality of tapered protrusions of a resin composition, one end of each of which is bonded to the front surface of the substrate, wherein the tapered protrusions are regularly arranged on the front surface of the substrate with a specific repeating pattern and each of the protrusions is surrounded with a plurality of grooves which intersect each other, characterized in that an arrangement density (D) of the tapered protrusions is in the range between 50 protrusions/cm$^2$ to 3,000 protrusions/cm$^2$,
a profile index (PI) of the tapered protrusions is in the range of between 5 and 100, wherein the profile index (PI) is defined by the formula (1):

$$PI = D \times H^2 \tag{1}$$

in which D is an arrangement density of the tapered protrusions (unit: protrusions/cm$^2$), and H is a height of the tapered protrusion (unit: mm),
and a wet-slip resistance number (a British Pendulum Tester number (BPN)), which is measured according to ASTM E-303-93, is at least 35.

DETAILED DESCRIPTION OF THE PREFERRED EMBODIMENTS

In the wet-slip resistant sheet of the present invention, the tapered protrusions are regularly arranged on the surface of the substrate with a specific repeating pattern and each of the protrusions is surrounded with a plurality of grooves which intersect each other, that is, they are pattern-arranged protrusions. Therefore, the BPN value can be easily controlled in the specific range. When the shapes and arrangement of the whole protrusions are designed using a profile index (PI), which is defined by the formula (1) as an index, the control of the BPN value becomes easier. Furthermore, the wet-slip resistance and the clean recovery can be achieved at the same time, since the arrangement density and PI of the tapered protrusions are controlled in the specific ranges.

When the arrangement density (D) of the tapered protrusions is less than 50 protrusions/cm$^2$, it is difficult to control the BPN value in the range of at least 35, and increase the wet-slip resistance. It is difficult to form the tapered projections with accurate shapes and sizes at an arrangement density exceeding 3,000 protrusions/cm$^2$. As a result, control of the BPN value becomes difficult.

When PI is less than 5, it is difficult to control the BPN value in the range of at least 35, and increase the wet-slip resistance. When PI exceeds 100, the clean recovery properties deteriorate and the rub-off stain due to the abrasion marks which are barely removed cannot be effectively prevented.

Through the control of the PI of the whole protrusions, the present invention can provide a wet-slip resistant sheet which has better clean recovery than the conventional sheets while it has the same wet-slip resistance (BPN) as the conventional ones (a high clean recovery wet-slip resistance sheet). Furthermore, with the control of PI of the whole protrusions, the present invention can provide a wet-slip resistant sheet having a higher wet-slip resistance while maintaining the clean recovery at the same level as the conventional ones (a high wet-slip resistant sheet).

Wet-slip Resistant Sheet

Figure 1:
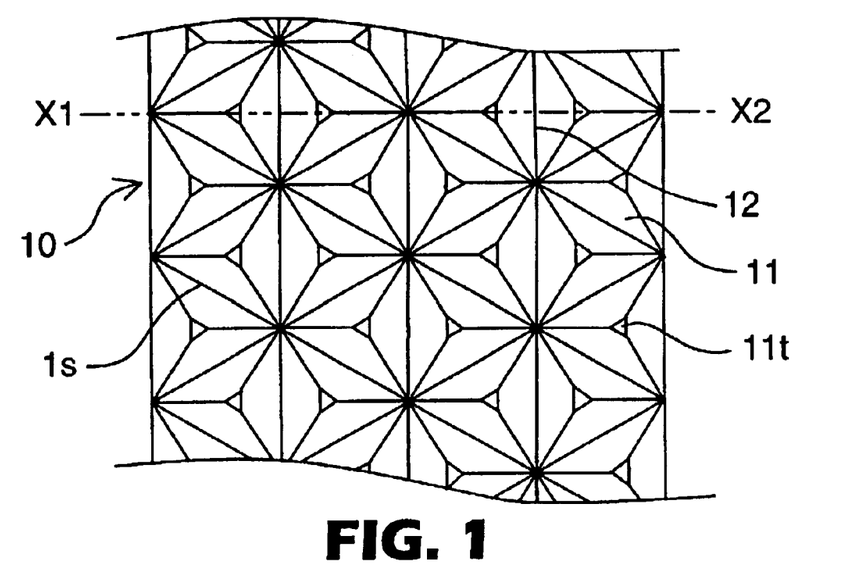
FIG. 1 is a plan view of one example of the wet-slip resistant sheet of the present invention.
Figure 2:
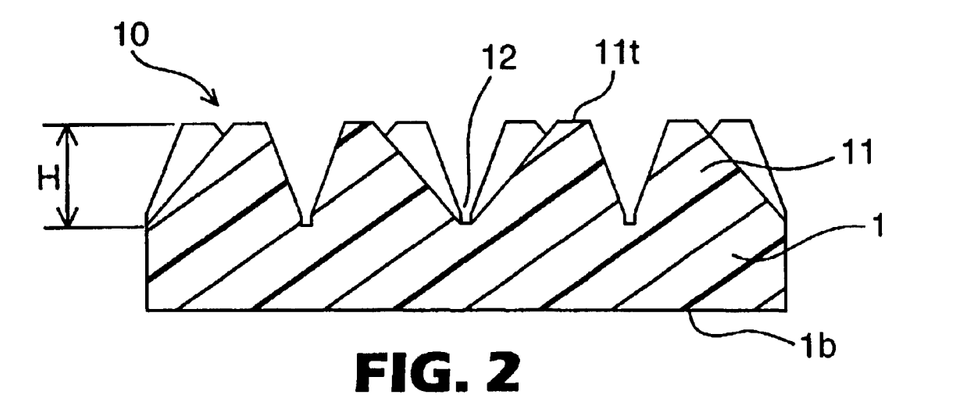
FIG. 2 is a vertical cross sectional view of along the line X1–X2 in FIG. 1.

One preferred embodiment of the wet-slip resistant sheet (10) according to the present invention is explained by making reference to FIGS. 1 and 2. FIG. 1 is a plan view of the surface of the slip resistant sheet, and FIG. 2 is a vertical cross sectional view along the line X1–X2 in FIG. 1.

The wet-slip resistant sheet (10) shown in the Figures comprises a support (1) having a front surface (1s) and a back surface (1b) opposing to the surface (1s), and a plurality of the tapered protrusions (11), one end of each of which is bonded to the surface (1s) of the substrate (1). The tapered protrusions (11) are regularly arranged on the front surface (1s) with the specific repeating pattern, and each protrusion is surrounded with the grooves (12) which intersect each other. The wet-slip resistant sheet (10) is typically used by fixing the back surface (1b) to the floor surface. Accordingly, an adhesive layer for fixing (not shown) is fixedly provided on the back surface (1b) of the substrate (1).

As explained above, the arrangement density (D) and the profile index PI of the tapered protrusions (11) are designed in the specific ranges. Since the wet-slip resistant sheet of the present invention is fixed to the floor surface in use, the BPN value is at least 35 so that it has a wet-slip resistance suitable for the floor application.

The BPN value is measured according to ASTM E-303-93.

The BPN value is usually not more than 100. When the BPN value is too large, it may be difficult to increase the clean recovery.

The clean recovery of the wet-slip resistance sheet can be evaluated by the following rub-off stain test.

First, the wet-slip resistant sheet is arranged on the floor surface of a passageway where passersby wearing shoes walk (that is, it is fixed to the floor surface with the back surface of the substrate facing the floor surface), and a practical test is carried out. Such a passageway may be a passageway (not open to public) in a factory where only employees wearing safety shoes walk. After a specific period (usually one week to one month of use), the ease of washing of the sheet with water is evaluated by comparing the ease with a new wet-slip resistant sheet, which has not been subjected to the above test. That is, the sheet is washed with water by a simple method, for example, with a brush, and whether the stains on the sheet can be removed is evaluated by eye. When PI exceeds 100 and the BPN value exceeds 100 in the above test, the clean recovery of the sheet is ranked NG (no good) (see Examples).

When the shape of the tapered protrusion is a frustum or a frustum with a rounded apex, the clean recovery is advantageously improved. The degree of the clean recovery may be evaluated using a clean recovery rate, which is measured according to JIS A 5712, as an index, although it can be measured by the above evaluation method.

Now, the clean recovery test will be explained.

As a sample, a wet-slip resistant sheet, which is cut to a square of 3 cm×3 cm is supplied. The surface of the sample is cleaned with a cloth impregnated with a 5% aqueous solution of a soap, and then the initial diffuse reflectance $Y_0$ is measured. Then, on the surface of the sample, the following stain component (1g) is smeared and kept standing for 30 minutes. Thereafter, the surface of the sample is scrubbed with a dried new cloth ten times to wipe the stain component off. Then, the diffuse reflectance $Y_1$ after wiping (after clean recovery) is measured.

The stain component is a mixture of white Vaseline (from Japan Pharmacopoeia) and carbon black in a weight ratio of 10:1.

The percentage of the former diffuse reflectance based on the latter ($Y=(Y_1/Y_0)\times100$) is calculated, and the Y value is used as a clean recovery (RC).

When the tapered protrusion is in the form of a frustum or a frustum with a rounded apex, the clean recovery can be effectively increased, for example, to 60% or more.

The protrusion (11) shown in FIGS. 1 and 2 is in the form of a frustum, which corresponds to a pyramid, a part of which near the top is cut away so that the apex part has a flat surface. The frustum with a rounded apex corresponds to a frustum, the apex of which is rounded in a dome form.

When the apex (11t) of the protrusion is substantially flattened, the height (H) of the tapered protrusion is the distance from the bottom (one end) of the protrusion to the flat surface on the top. When the protrusion is in the form of a frustum with a rounded apex and the apex has a curved surface, the height (H) is the distance from the bottom of the protrusion to the point on the rounded surface that is most distant from the bottom.

A ratio of the $H_0$ (the height of an untruncated pyramid corresponding to a frustum) to the actual height (H) of the frustum ($H_0/H$) is usually from 0.60 to 0.98, and preferably from 0.70 to 0.95 in the case of the frustum with a flattened apex, or usually from 0.70 to 1.00, and preferably from 0.75 to 0.98 in the case of the frustum with the rounded apex.

The shape of the bottom of the frustum or the frustum with the rounded apex may be a polygon. A polygon with a smaller number of sides is better, since the wet-slip resistance can be advantageously improved without deteriorating the clean recovery. The shape of the bottom of the frustum is preferably a square or a triangle, and is more preferably a triangle.

The tapered protrusion may be in the form of a pyramid or a cone. The pointed apex of the pyramid or the cone may be advantageous, when the required level of the clean recovery is not so high (for example, when no graphics are present under the substrate), or when the resin composition effective to increase the clean recovery is used and the wet BPN value is increased as much as possible. In such a case, PI is selected in a range between 15 and 100, since the BPN value can be easily controlled in a relatively high range.

When PI is in the range between 15 and 100 and the BPN value is controlled in the range between 60 and 95, a high wet-slip resistant sheet, which is suitably used by being fixed to a slope or stairs, is easily produced. From the viewpoint of slip resistance, the BPN value is preferably as high as possible in the range of 60 or higher. However, if the BPN value is too high, the clean recovery may decrease and thus replacement intervals of the sheet may be shortened. Furthermore, the abrasion resistance of the tapered protrusions may deteriorate. Preferably, the BPN value does not exceed 95.

The apex angle of the protrusion is not limited, insofar as the BPN value can be controlled in the specified range, and is preferably from 60 to 110 degrees. In this range, the BPN value can be easily increased. The apex angle of the pyramidal protrusion is a vertex angle of a side triangle of the pyramid having the vertex at the other end of the protrusion which is not bonded to the substrate. The largest vertex angle is used as the apex angle of the protrusion. In the case of a cone, the apex angle is a vertex angle of a triangle appearing on the vertical cross section of the cone having the vertex at the other end of the protrusion which is not bonded to the substrate.

The tapered protrusions may include several types of protrusions having different shapes or sizes. In such a case, the size, the apex angle, PI, etc. of the protrusions are the average values of all the protrusions included in one cycle of the repeated pattern. The several types of the protrusions preferably have substantially the same height.

It is preferable to compound a hard resin and a surface-modifier in a resin composition for the formation of the protrusions so that the clean recovery properties are improved without relying on the function of the above shape factors. Thereby, the firm adhesion of the stain materials is effectively prevented, and thus the clean recovery can be improved. More preferably the resin composition contains the surface-modifier, the hard resin and a plurality of hard beads dispersed in the hard resin.

The surface modifier may be a silicone base or fluorine-containing surface modifier. As a surface modifier, a coating type surface modifier disclosed in JP-A-­6-240201 may be used.

The hard resin means a cured resin. The hard resin is usually formed of a mixture of a curable resin and a curing agent. The curing agent may be omitted, when the curable resin can be crosslinked in the absence of the curing agent.

The hard beads may be ceramic beads, inorganic oxide beads, etc. The Vickers hardness of the hard beads is preferably at least 1,000 kg/mm$^2$. The "Vickers hardness" is measured by mixing about 10 to 20 hard beads having a particle size of about 1 mm and 10 g of an epoxy resin and hardening them to form a cylindrical sample having a diameter of about 3 cm and a height of about 1 cm, abrading the sample to expose the beads on the surface and measuring the hardness with a micro hardness meter. A load of 300 g is applied, and a loading time is about 15 seconds.

According to the present invention, it is possible to produce a wet-slip resistant structure with good wet-slip resistance comprising a floor surface of a building and the wet-slip resistant sheet of the present invention, which is fixed to the floor surface. For example, the wet-slip resistance sheet may be used on a floor surface facing outdoors, or on an indoor floor surface which is present near an entrance which faces outdoors. In such a case, a quantity of water which is carried onto the floor surface tends to form a slippery aqueous film. The wet-slip resistant structure of the present invention can effectively prevent the slippage of the passersby caused by the formation of the aqueous film.

Production of Wet-slip Resistant Sheet

In the production of the wet-slip resistant sheet of the present invention, the tapered protrusions may be formed by any conventional method. In general, a sheet-form substrate of a resin composition having no tapered protrusion on its surface is provided, and the substrate surface is embossed to form tapered protrusions integral with the substrate. The resin composition from which the protrusions are formed is a relatively hard resin composition comprising a polymer. For example, the polymer may be at least one polymer selected from the group consisting of polyurethane, vinyl chloride polymers, acrylic polymers, polyester, polycarbonate, polyamide, polyolefin, polystyrene, silicone, fluoropolymer and epoxy polymers (cured epoxy polymers). As described above, the polymer may be cured (crosslinked) with the crosslinking agent.

The hardness of the protrusions (i.e. the hardness of the resin composition) is usually from 2 to 10,000 MPa, preferably from 5 to 5,000 MPa in terms of a Young's modulus measured at 25° C.

The resin composition for forming the protrusions may contain various additives such as a surface-modifier, a curing agent, a surfactant, hard beads, a flame-retardant, a UV-ray absorber, an antioxidant, a tackifying resin, a colorant, an antibacterial agent, etc.

Usually, the embossing for the formation of the protrusions may be carried out by placing the precursor of the protective sheet between a processing roll and a back-up roll and transferring the surface roughness of the processing roll to the sheet. That is, a pressing roll, the surface of which has an uneven shape or roughness corresponding to those to be transferred to the surface of the protective layer, is pressed against the surface of the protective layer. Preferably, the embossing is carried out while heating.

The heating temperature is usually from 120 to 270° C., and preferably from 130 to 260° C. The pressure is usually from 4 to 10 kg/cm$^2$ (about 0.4 to 1.0 MPa).

The processing roll is usually a steel roll having a metal plating (e.g. chromium, etc.), so that the surface roughness is precisely controlled. The back-up roll is usually a soft roll comprising a metal roll and a surface-covering material made of a soft material such as a rubber or cotton which is wrapped around the metal roll, although the back-up roll may be made of the same material as the processing roll. Other embossing conditions may be the same as those employed in the embossing of the surface of the protective layer of conventional decorative sheets.

When the resin composition comprises the hard resin, preferably a sheet-form laminate, which has a cushioning layer consisting of a thermoplastic resin layer adhered to the back surface of the substrate, is used and embossed. The thickness of the cushioning layer is usually from 25 to 500 μm.

The thickness of the wet-slip resistant sheet is not limited insofar as the effects of the present invention can be achieved, and a wet-slip resistant sheet ranging from a small thickness to a large thickness may be used. The thickness of the wet-slip resistant sheet is usually from 0.06 to 2.5 mm, and preferably from 0.08 to 1.6 mm.

The height (H) of the protrusions is usually from 0.05 to 2 mm, preferably from 0.06 to 1.5 mm, and more preferably from 0.07 to 1 mm.

Graphics-Protective Sheet

Figure 3:
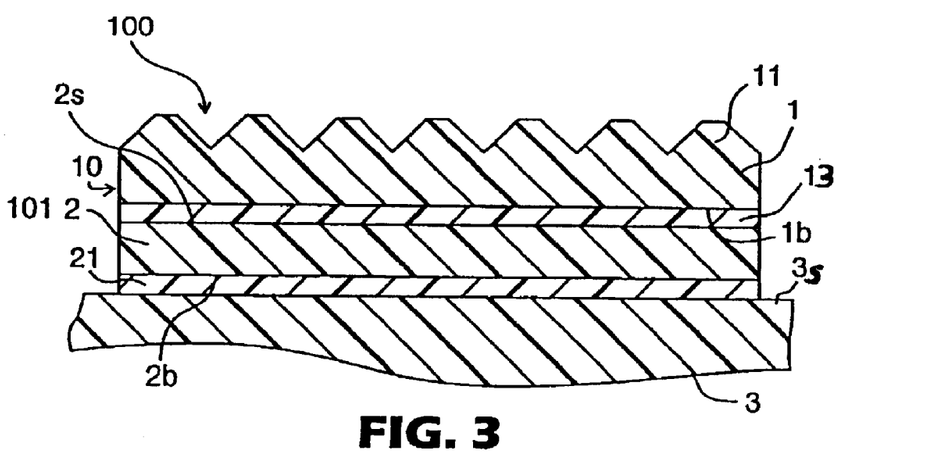
FIG. 3 is a cross sectional view of another example of the wet-slip resistant sheet of the present invention, which is used as a graphics-protective sheet.

An embodiment as shown in FIG. 3 uses the wet-slip resistant sheet of the present invention as a graphics-protective sheet.

The wet-slip resistant sheet (10) is used as the protective layer of the decorative layer (2) adhered to the surface (3s) of the floor (3). That is, the wet-slip resistant sheet (10) constitutes the decorative sheet (101) in combination with the decorative layer (2).

The wet-slip resistant sheet (10) is fixed to the surface (2s) of the decorative layer (2) through the adhesive layer (13). The adhesive layer (13) may be previously fixedly provided on the back surface (1b) of the substrate (1) of the wet-slip resistant sheet.

The decorative sheet (101) is fixed to the floor surface (3s) through the adhesive layer (21), which is fixedly provided on the back surface (2b) of the decorative sheet. The decorative layer (2) may be the same as that of the conventional decorative sheet, and is usually a film or a medium having applied graphics. The decorative sheet (101) is combined with the floor (3) to form the decorative wet-slip resistant structure (100). The whole thickness of the decorative sheet (101) (including the two adhesive layers 13 and 21) is not limited, but is usually from 0.1 to 1 mm. The thickness of the wet-slip resistant sheet assembled in the decorative sheet is usually from 0.06 to 0.5 mm, and preferably from 0.08 to 0.4 mm.

The wet-slip resistant sheet (10), which is used as the graphics-protective sheet, preferably has a high light transmittance. In this case, the light transmittance is usually at least 65%, preferably at least 70%, particularly preferably at least 80%, when it is measured by illuminating the light on the back surface (1b). When the light transmittance is too low, the visibility of the graphics applied to the adherent surface such as the medium may deteriorate. Herein, the "light transmittance" is a light transmittance measured according to JIS K 7105 (Measuring method of light transmittance).

The adhesive layer (13) usually consists of a coating layer or a film of an adhesive such as a heat-sensitive adhesive, a pressure-sensitive adhesive, a hot-melt adhesive, a curing type adhesive, etc. The adhesive layer (13) preferably has a high light transmittance, which is usually at least 70%, and preferably at least 80%.

The adhesive layer (21) can be formed from the same adhesive as exemplified above, and preferably from a material comprising a pressure-sensitive adhesive. As such, the sheet can be fixed to the floor surface by pressing the sheet to the floor and the application becomes relatively easy. Advantageously, the adhesive layer (21) comprises a double-coated adhesive film having an elastically deformable layer such as a foam layer since the wet-slip properties are improved.

When the wet-slip resistant sheet is used as a graphics-protective sheet, preferably, the arrangement density (D) of the tapered protrusions is from 300 to 2,500 protrusions/cm$^2$, and PI is from 10 to 40. In this embodiment, the wet-slip resistant sheet can effectively improve the clean recovery and the wet-slip resistance (BPN value) with good balance. When the clean recovery is high, the stains can be removed with self-cleaning function (with wind or rain) or simple cleaning methods so that the original color or transparency of the slip resistant sheet can be easily maintained. When the substrate of the slip resistant sheet is transparent, the wet-slip resistant sheet of the present invention is preferably used as the graphics-protective sheet which protects the graphics provided between the substrate and the floor surface.

When the wet-slip resistant sheet of the present invention is used as the graphics-protective sheet or the protective layer of the graphics, the clean recovery defined above is preferably at least 60%. If the clean recovery is less than 60%, the visibility of the graphics deteriorates after the sheet is fixed and used on the floor for a relatively long time (for example, six months or longer). When the BPN value is too large, it is difficult to increase the clean recovery. Thus, the BPN value is preferably from 40 to 90 to increase the wet-slip resistance and the clean recovery with good balance. The clean recovery (according to JIS A 5712) is more preferably at least 70%.

In the case of the wet-slip resistant structure described above, preferably, the graphic is placed below the substrate so that it can be seen through the substrate, and the graphic includes some guiding information. The guiding information means a destination guidance such as a name of a place or a building to which the passageway is connected, a distance (including a time or the number of steps) to the place or building, the direction to the place or building (including an azimuth, etc.). The guiding information may contain the name of a building having the entrance, the owner of the building, the business performed in the building, a welcome message for visitors, etc.

EXAMPLES

In the Examples, two types of wet-slip resistant sheets were produced as described below:

Production of Type a Wet-Slip Resistant Sheet

The type A wet-slip resistant sheet was produced by cutting the surface of a support made of an acrylic resin having a thickness of 2 mm (a plane size=150 mm×150 mm) to form tapered protrusions having a specific PI and a height. The shape of the tapered protrusion of the type A sheet was a triangular pyramid or a pyramid.

The height (H), the arrangement density (D), PI, the shape and the apex angle of the protrusions of the sheet produced in each Example are shown in Table 1. These values were measured with an optical microscope.

Production of Type B Wet-Slip Resistant Sheet

The type B wet-slip resistant sheet was produced by thermally embossing the surface of a substrate made of a vinyl chloride resin film having a thickness of 150 µm (a vinyl chloride resin film of BANDO Chemical Co., Ltd. having a light transmittance of 97%) to form tapered protrusions having a specific PI and a height. The thermal embossing was carried out by an embossing method using a processing roll and a back-up roll. The embossing conditions included a temperature of 180° C. and a pressure of 0.6 MPa.

The shape of the tapered protrusion of the type B sheet was a frustum of a triangular pyramid as shown in FIGS. 1 and 2. The ratio of the height (H$_0$) of the frustum to the height (H) of the original triangular pyramid was about 0.8 to 0.9.

The height (H), the arrangement density (D), PI, the shape and the apex angle of the protrusions of the sheet produced in each Example are shown in Table 1.

Comparative Example 1

This Comparative Example relates a wet-slip resistant sheet having PI larger than the specified range. The wet-slip resistant sheet of this Comparative Example was produced in the same manner as in the production of the type A sheet of the Examples except that the embossing pattern was changed so that PI was 112.

The height (H), the arrangement density (D), PI, the shape and the apex angle of the protrusions of the sheet produced in this Comparative Example are shown in Table Comparative Examples 2–6

These Comparative Examples relate a slip resistant sheet having PI smaller than the specified range. The wet-slip resistant sheet of the Comparative Example was produced in the same manner as in the production of the type A sheet of the Examples except that the embossing pattern was changed so that PI was the value shown in Table 1.

The height (H), the arrangement density (D), PI, the shape and the apex angle of the protrusions of the sheet produced in each Comparative Example are shown in Table 1.

Comparative Example 7

The slip resistant sheet of this Comparative Example was produced in the same manner as in the production of the type B sheet of the Examples except that the embossing pattern was changed so that the shapes and arrangement of protrusions were irregular.

A typical area of the surface of this slip resistant sheet was selected and observed with an optical microscope (with a magnification of 100 times). The groups of the irregularly shaped protrusions having different heights from group to group were observed, and in the typical area, the groups of the protrusions having a height of 0.05 mm or larger and the groups of the protrusions having a height of less than 0.05 mm ranged irregularly. The average height of the protrusions was about 0.1 to 0.2 mm, which was relatively large.

Comparative Example 8

A protective sheet having a smooth surface was produced in the same manner as in the production of the type B sheet of the Examples except that the sheet was not embossed.

With the wet-slip resistant sheets of Examples (or the protective sheet of Comparative Examples), the following properties were evaluated:

1) Evaluation of wet-slip resistant properties (measurement of a BPN value): The BPN value was measured according to ASTM E-303-93.

2) Clean recovery (CR): The clean recovery was measured according to JIS A 5712.

3) Rub-off Stain: A sample of the slip-resistant sheet of each Example having a surface area of 5 cm×5 cm was adhered to the surface of a passageway where only employees wearing safety shoes walk, and left as it was for one month. Thereafter, the surface of the sheet was washed with water using a brush, and it was visually observed whether the stains could be removed from the surface of the sheet, and the condition of the sheet surface was compared with that of the new sheet prior to the test. Based on the results, when the rub-off stain caused by the abrasion marks due to the shoe soles could be completely removed, the rub-off stain was evaluated as "GOOD". When the stain was not partly removed, but the percentage of the area from which the stain could not be removed was less than about 40%, and the appearance did not deteriorate, the rub-off stain was evaluated as "ACCEPTABLE". When the percentage of the area from which the stain could not be removed was about 40% or more, and the sheet was stained such that the appearance did not deteriorate, the rub-off stain was evaluated as "NO GOOD".

The results of the evaluations are shown in Table 1.

Figure 4:
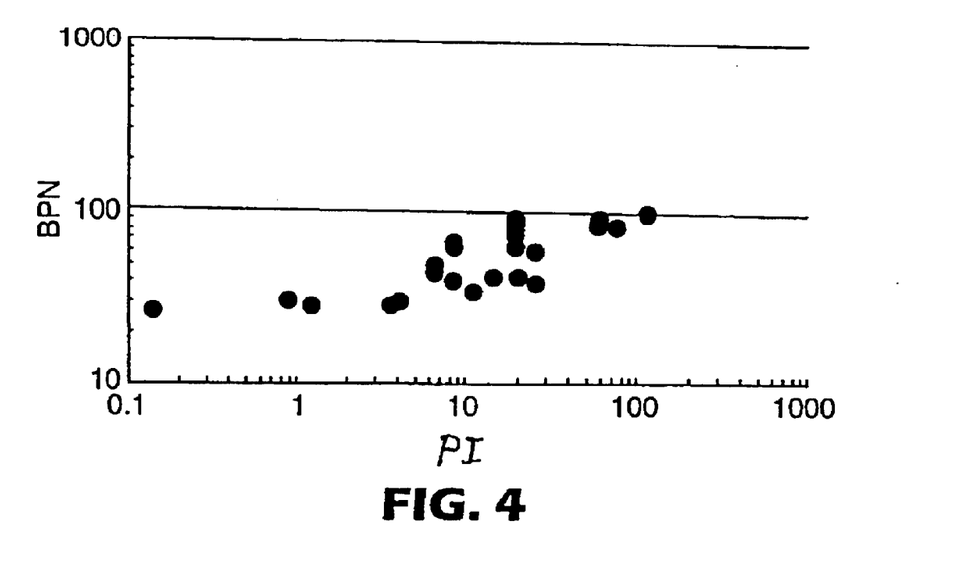
FIG. 4 is a graph plotting the BPN values of Examples 1–20 and Comparative Examples 1–6 against PI.

The BPN values measured in Examples 1–20 and Comparative Examples 1–6 are plotted in FIG. 4.

TABLE 1

| | PI | BPN | Stain recovery [%] | Rub-off stain | Shape | H [mm] | Apex angle [deg.] | D [/cm²] | Type |
|---|---|---|---|---|---|---|---|---|---|
| Ex. 1 | 75 | 86 | 4 | Acceptable | pyramid | 0.6 | 60 | 208 | A |
| Ex. 2 | 58 | 91 | 5 | Acceptable | triang. pyramid | 0.3 | 79 | 642 | A |
| Ex. 3 | 58 | 92 | 16 | Acceptable | triang. pyramid | 0.4 | 79 | 361 | A |
| Ex. 4 | 58 | 90 | 4 | Acceptable | triang. pyramid | 0.8 | 79 | 90 | A |
| Ex. 5 | 58 | 87 | 4 | Acceptable | triang. pyramid | 0.6 | 79 | 160 | A |
| Ex. 6 | 25 | 40 | 24 | Good | pyramid | 0.2 | 90 | 625 | A |
| Ex. 7 | 25 | 60 | 30 | Good | pyramid | 0.4 | 90 | 156 | A |
| Ex. 8 | 20 | 43 | 73 | Good | triang. pyramid frustum | 0.09 | flat top | 2470 | B |
| Ex. 9 | 20 | 95 | 14 | Good | triang. pyramid | 0.15 | 108 | 867 | A |
| Ex. 10 | 19 | 85 | 18 | Good | triang. pyramid | 0.3 | 108 | 214 | A |
| Ex. 11 | 19 | 80 | 15 | Good | triang. pyramid | 0.2 | 108 | 481 | A |
| Ex. 12 | 19 | 66 | 18 | Good | triang. pyramid | 0.4 | 108 | 120 | A |
| Ex. 13 | 14 | 43 | 70 | Good | triang. pyramid frustum | 0.2 | flat top | 360 | B |
| Ex. 14 | 11 | 35 | 78 | Good | triang. pyramid frustum | 0.09 | flat top | 1350 | B |
| Ex. 15 | 8.4 | 40 | 41 | Good | pyramid | 0.3 | 120 | 93 | A |
| Ex. 16 | 8.3 | 64 | 18 | Good | pyramid | 0.1 | 120 | 833 | A |
| Ex. 17 | 8.3 | 67 | 50 | Good | pyramid | 0.2 | 120 | 208 | A |
| Ex. 18 | 8.3 | 40 | 33 | Good | pyramid | 0.4 | 120 | 52 | A |
| Ex. 19 | 6.4 | 49 | 58 | Good | triang. pyramid | 0.1 | 134 | 642 | A |
| Ex. 20 | 6.4 | 46 | 50 | Good | triang. pyramid | 0.2 | 134 | 160 | A |

TABLE 1-continued

|      | PI   | BPN | Stain recovery [%] | Rub-off stain | Shape | H [mm] | Apex angle [deg.] | D [/cm²] | Type |
|------|------|-----|--------------------|---------------|-------|--------|-------------------|----------|------|
| C. 1 | 112  | 102 | 4  | NG   | triang. pyramid          | 0.6  | 62       | 312  | A    |
| C. 2 | 4.0  | 30  | 75 | Good | triang. pyramid frustum  | 0.04 | flat top | 2470 | B    |
| C. 3 | 3.6  | 29  | 72 | Good | triang. pyramid frustum  | 0.1  | flat top | 360  | B    |
| C. 4 | 1.2  | 28  | 80 | Good | triang. pyramid frustum  | 0.03 | flat top | 1350 | B    |
| C. 5 | 0.9  | 30  | 73 | Good | triang. pyramid frustum  | 0.15 | flat top | 40   | B    |
| C. 6 | 0.1  | 26  | 85 | Good | triang. pyramid frustum  | 0.06 | flat top | 40   | B    |
| C. 7 | 14.1 | 45  | 44 | Good | random emboss            | 0.15 | —        | 625  | B    |
| C. 8 | 0.0  | 15  | 98 | Good | no emboss                | 0.0  | —        | 0.0  | flat |

The wet-slip resistant sheets of Examples 1–20 had good wet-slip resistant properties and clean recovery.

In Comparative Example 1 in which PI was 112, the rub-off stain of the surface was judged NO GOOD. In Comparative Examples 2–6 in which PI was 4 or less, the BPN values were all 30 or less, and the wet-slip resistant properties were judged NO GOOD. The sheet of Comparative Example 8 having the smooth surface had the smallest BPN value of 15.

The above results of the evaluations will be examined more in detail.

The sheets of Examples 6–20 having PI of 40 or less had the rub-off stain better than those of Examples 1–5 having the relatively large PI. To achieve a clean recovery of 60% or more, the sheets having PI of 40 or less and the flat apex of the protrusion were advantageous, and the triangular pyramid was more advantageous than the pyramid.

Decorative Sheet

Using the type B slip resistant sheet of the Examples, a graphics-protective sheet of each Example was produced and then a decorative sheet of each Example was produced using the graphics-protective sheet as follows:

First, a coating liquid containing an acrylic self-adherent polymer was applied on a release paper so that a dry thickness was 30 μm and dried to form an adhesive layer (with a release paper). Then, the adhesive layer was laminated on the back surface of the substrate of the slip resistant sheet to obtain a graphics-protective sheet. Finally, the release paper was removed, and the protective sheet was laminated on the surface having the graphics drawn on a film (having a thickness of 80 μm) through the adhesive layer to finish the decorative sheet of each Example.

The decorative sheet was fixed to the floor surface with an adhesive, and the graphics was visually observed through the protective sheet from right above the decorative sheet. As a result, the graphics of the decorative sheets could be well observed in all the Examples, and the characters and designs could be correctly recognized.

What is claimed is:

1. A wet-slip resistant sheet comprising a substrate having a surface and a back surface opposing to said surface, and a plurality of tapered protrusions of a resin composition, one end of each of which is bonded to said surface of the substrate, wherein said tapered protrusions are regularly arranged on said surface of the substrate with a specific repeating pattern and each of said protrusions is surrounded with a plurality of grooves which intersect each other, characterized in that an arrangement density (D) of said tapered protrusions is in the range between 50 protrusions/cm² to 3,000 protrusions/cm², a profile index (PI) of said tapered protrusions is in the range between 5 and 100, wherein the profile index (PI) is defined by the formula (1):

$$PI = D \times H^2 \qquad (1)$$

in which D is an arrangement density of the tapered protrusions (unit: protrusions/cm²), and H is a height of the tapered protrusions (unit: mm), and a wet-slip resistance number (a British Pendulum Tester number (BPN)), which is measured according to ASTM E-303-93, is at least 35.

2. The wet-slip resistant sheet according to claim 1, wherein the shape of said tapered protrusion is a frustum or a frustum with a rounded apex.

3. The wet-slip resistant sheet according to claim 1, wherein the arrangement density (D) of said tapered protrusions is from 300 protrusions/cm² to 2,500 protrusions/cm², and said profile index (PI) is from 10 to 40.

4. The wet-slip resistant sheet according to claim 1, wherein the shape of said tapered protrusion is a pyramid or a cone, said profile index (PI) is from 15 to 100, and said BPN measured by the method described in claim 1 is from 60 to 95.

5. A wet-slip resistant structure comprising a floor having a surface and a wet-slip resistant sheet according to claim 1 which is fixed to the surface of the floor, wherein the surface is selected from the group of a floor surface facing outdoors and an indoor floor surface which is present near an entrance which faces outdoors.

* * * * *